United States Patent [19]

Russell

[11] 4,064,338
[45] Dec. 20, 1977

[54] METHOD FOR PREPARING BIOLOGICALLY ACTIVE COPOLYMERS OF TRIORGANOTIN ACRYLATES

[75] Inventor: David B. Russell, Westfield, N.J.

[73] Assignee: M & T Chemicals Inc., Greenwich, Conn.

[21] Appl. No.: 720,950

[22] Filed: Sept. 7, 1976

[51] Int. Cl.$^2$ .......................... C08F 2/00; C08F 4/00; C08F 30/04; C08F 230/04

[52] U.S. Cl. .................................... 526/230; 424/81; 526/89; 526/232; 526/240

[58] Field of Search ................. 526/89, 230, 232, 240; 424/81

[56] References Cited

U.S. PATENT DOCUMENTS

| | | |
|---|---|---|
| 3,016,369 | 1/1962 | Montermoso et al. .............. 526/240 |
| 3,167,473 | 1/1965 | Leebrick ................................. 424/81 |
| 3,167,532 | 1/1965 | Leebrick .............................. 526/240 |
| 3,555,148 | 1/1971 | Katsumura et al. ................. 526/240 |

OTHER PUBLICATIONS

Bull 14/61 Rus. 139,834, "Method for The Production of Tin–Organic Polyacrylates", Kochkin et al., (684337/23-2-11-60) U.S.S.R.

Primary Examiner—Herbert J. Lilling
Attorney, Agent, or Firm—Kenneth G. Wheeless; Robert Spector

[57] ABSTRACT

Biologically active copolymers wherein a portion of the repeating units exhibit a triorganotin moiety ($R_3Sn-$) are prepared by solution polymerization using liquid aliphatic or cycloaliphatic hydrocarbons as the polymerization medium. The physical and chemical properties of the copolymers make them more suitable for use as biocides than polymers prepared using methods described in the prior art.

9 Claims, No Drawings

METHOD FOR PREPARING BIOLOGICALLY ACTIVE COPOLYMERS OF TRIORGANOTIN ACRYLATES

BACKGROUND OF THE INVENTION

This invention relates to a method for preparing copolymers incorporating a triorganotin moiety. This invention further relates to a method for preparing tin-containing polymers which retain their biological activity over a longer period of time relative to prior art materials.

The biological activity of polymers containing at least one triorganotin moiety ($R_3Sn-$) is well known. U.S. Pat. No. 3,167,473 discloses polymers obtained by polymerizing triorganotin derivatives of ethylenically unsaturated acids, including acrylic, methacrylic, and vinylbenzoic acids. The resultant products are employed as the toxicant in antifouling marine coatings and in compositions applied to agricultural food crops for the purpose of protecting them against infestation by a variety of harmful organisms, particularly fungi.

In accordance with the teaching of the aforementioned U.S. Pat. No. 3,167,473 the triorganotin-containing polymers are obtained using conventional bulk, solution or emulsion polymerization techniques. The examples of this patent disclose emulsion and bulk polymerization.

It has now been found that the biological activity of a given organotin-containing polymer is strongly influenced by the manner in which the polymer is prepared. Specifically, superior results are achieved using polymers obtained by solution polymerization in non-aromatic liquid paraffinic hydrocarbons such as hexane, heptane and cyclohexane. The polymerization medium may optionally contain up to 50% by volume, based on total liquid hydrocarbons, of a liquid aromatic hydrocarbon such as toluene or xylene.

SUMMARY OF THE INVENTION

This invention provides an improved method for preparing biologically active copolymers by reacting at least one solubilized triorganotin compound of the general formula

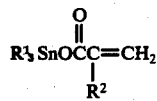

with at least one solubilized copolymerizable monomer of the general formula

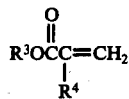

at a temperature from 50° to 100° C. in the presence of a solvent for the monomers and an effective amount of a free radical polymerization initiator. The triorganotin compound constitutes from 30 to 70 mole % of the total monomers present. The improvement resides in conducting the polymerization in the presence of an inert liquid medium consisting essentially of at least one liquid aliphatic or cycloaliphatic hydrocarbon containing from 5 to 16 carbon atoms. Optionally the liquid medium may contain up to 50% by volume of at least one liquid aromatic hydrocarbon. In the foregoing formulae $R^1$ represents an alkyl radical containing from 1 to 8 carbon atoms, a cyclohexyl or a phenyl radical, $R^2$ and $R^4$ are individually selected from the group consisting of hydrogen and methyl and $R^3$ represents an alkyl radical containing from 1 to 18 carbon atoms, a cycloalkyl or a phenyl radical.

DETAILED DESCRIPTION OF THE INVENTION

The triorganotin compounds employed to prepare the biologically active polymers are derivatives of acrylic or methacrylic acid. The compounds are conveniently obtained by reacting the acid or other suitable derivative such as an ester or halide with the desired triorganotin oxide, hydroxide or halide. If a halide is used, the reaction is conventionally carried out in the presence of a suitable acid acceptor as is well known in the art.

Triorganotin compounds preferred for use in the present method contain a total of from 3 to 24 carbon atoms bonded to the tin atom. Representative compounds of this type are tri-n-methyltin methacrylate, tri-n-butyltin acrylate, tri-n-butyltin methacrylate, tri-n-propyltin acrylate, tri-n-propyltin methacrylate, trioctyl-, tricyclohexyl-, triphenyltin acrylate and triphenyltin methacrylate. In accordance with the present method, one or more of these compounds is reacted with at least one copolymerizable monomer that is preferably selected from the group consisting of esters of acrylic and methacrylic acids. Vinyl monomers such as vinyl chloride, styrene, vinyl acetate and vinyl butyrate are also useful, as are maleic acid, acrylic acid, methacrylic acid, acrylamide and acrylonitrile. The polymer is prepared by dissolving the desired monomer mixture in a suitable liquid hydrocarbon medium, as specified hereinbefore, which contains a free radical initiator. The polymerization can be carried out at any convenient temperature, however temperatures in the range from 40° to 90° C. are preferred. The free radical initiator should be soluble in the polymerization medium and exhibit a half life of from 20 min. to 120 hours at the polymerization temperature. Suitable initiators include the conventional peroxides and hydroperoxides such as benzoyl peroxide and cumene hydroperoxide. The concentration of initiator is conventionally from about 0.001 to 0.01 mole %, based on total monomers. To achieve a useful degree of conversion to polymer, the total concentration of monomers should be from 1.5 to 10 moles per liter of reaction mixture, preferably from 2 to 5 moles per liter, to obtain a conversion of 95% or higher.

Liquid hydrocarbons useful as polymerization media for the present method include pentane, hexane, heptane, octane, cyclohexane and cyclooctane. Mixtures containing two or more of these hydrocarbons are also suitable. Such mixtures are commercially available as petroleum ether, mineral spirits, ligroin and Varsol ® (a registered trademark of the Exxon Company). The polymerization medium should be a solvent for all of the monomers, the final polymer and the free radical initiator.

The physical and chemical properties of polymers prepared in accordance with the present method using liquid aliphatic or cycloaliphatic hydrocarbons containing from 5 to 16 carbon atoms differ considerably from those of polymers obtained by bulk polymerization, emulsion polymerization in aqueous media or by solution polymerization of the same monomers in xylene. Bulk and emulsion polymerization are exemplified in the aforementioned U.S. Pat. No. 3,167,473. Particularly, the second order glass transition temperature of the present polymers are lower than polymers of the same monomer composition prepared using other methods. Additionally, the rate at which the tin-containing species is released from the polymer by hydrolysis is considerably slower, yet is sufficient to achieve the desired level of biological activity. The polymers will therefore retain their biological activity over a longer period of time relative to polymers prepared using other conventional techniques. This is particularly advantageous when the polymer is incorporated as the active toxicant in an antifouling coating formulation, since the ship or other structure will require less frequent repainting.

It is well known that the difference in physical properties and chemical reactivity exhibited by polymers of the same monomer composition are indicative of structural differences, particularly the order in which the repeating units are arranged along the polymer molecule. It is believed that polymers prepared in accordance with the present method exhibit an alternating arrangement of repeating unit. This can be accounted for by formation of a complex between the triorganotin compound and the comonomer. The presence of aromatic solvents such as xylene inhibits complex formation between the comonomers resulting in a more random distribution of repeating units. The degree of alternation is, of course, also dependent upon the relative concentrations of the two monomers, and will be most evident when the two comonomers are present in equal amounts. It is this type of alternating structure that is believed responsible for the slower release of the triorganotin species, which could explain the long-term biological activity of the present polymers It will therefore be understood that equal concentrations of triorganotin compound and comonomer are usually preferred, although monomer mixtures containing from 30 to 70 mole % of the triorganotin compound also yield useful products.

Biologically active polymers prepared in accordance with the present method can be applied to a variety of materials and other substrates, including fabrics, metal and food crops, in the form of compositions containing an inert diluent. The inert diluent can be a liquid hydrocarbon such as benzene, toluene, naphtha, mineral spirits, or ligroin. The inert diluent may also be a liquid dispersant which is not a solvent for the polymer, e.g. water. Other suitable inert diluents include solid diluents or carriers such as talc, limestone or diatomaceous earth. Other preferred inert diluents include oil-based or water-based paints. If desired, the biologically active polymer can replace part or all of the binder in paints.

Where the biologically active polymer is employed in a composition containing an inert diluent, the biologically active polymer typically comprises from 0.01 to 80% by weight of the total composition. Preferably, it comprises from 0.2 to 60% of the composition.

The particular composition employed and the amount of biologically active polymer contained therein are selected in accordance with the material to be treated and the organism against which protection is desired. According to certain preferred embodiments of this invention, the biologically active polymers are employed as the active ingredient of antifouling coating compositions, including paints. Typically antifouling paints contain a polymeric or resin base, including vinyl, acrylic, alkyd, epoxy, chlorinated rubber, urethane and polyester resin bases. They may also contain pigments such as cuprous oxide, iron oxide and titanium dioxide; thickeners such as bentonite; fillers such as talc, aluminum silicate and calcium silicate; and driers such as cobalt naphthenate and manganese naphthenate. These compositions also usually contain solvents or thinners typified by mineral spirits, naphtha, benzene, toluene and methyl ethyl ketone. When the biologically active polymers of this invention are employed in antifouling marine coating compositions, they are typically employed in the amount of about 1–30%, based on the weight of the total composition.

A typical antifouling paint prepared in accordance with this invention has the following composition wherein all parts are parts by weight.

| | |
|---|---|
| Titanium dioxide | 19.4 |
| Aluminum silicate | 5.8 |
| Fibrous talc | 3.4 |
| High flash naphtha | 54.2 |
| Toluene | 18.2 |
| Tri-n-butyltin methacrylate-methyl methacrylate copolymer | 15.3 |

In accordance with certain other preferred embodiments, the biologically active polymers of this invention can be used as the active ingredients of agricultural treatment compositions which are employed in the treatment of plants, seeds, tubers, and the like. They are particularly useful in this respect because of their markedly and unexpectedly reduced phytotoxicity. The polymers of triphenyltin compounds (i.e. those wherein $R^1$ is phenyl) possess particularly low phytotoxicity. Agricultural treating compositions can be prepared in the form of dusting powers or wettable powders. They typically contain adjuvants or carriers such as clay, diatomaceous earth, limestone, and talc. Dusting powders are usually applied as such, while wettable powders are dispersed in a liquid diluent, preferably water, before application. In accordance with this invention, the biologically active polymer typically constitutes about 1–60% by weight of the agricultural treatment composition. Where the composition is a wettable powder, the biologically active polymer is typically present in the amount of about 10–60% and preferably 15–40% by weight of the composition. Wettable powders can be applied to plants by dispersing about 0.25–5 pounds of wettable powder in 100 gallons of water. Such dispersions contain the biologically active polymer in a concentration of 0.005–0.25%, preferably 0.01–0.05% by weight. Plants are treated with the dispersion by spraying at the rate of about 100–150 gallons of dispersion per acre.

A typical wettable powder formulated in accordance with this invention has the following composition, wherein all parts are parts by weight.

| | |
|---|---|
| Triphenyltin methacrylate copolymer | 20.0 |
| Attapulgus clay[1] | 76.0 |
| Wetting agent[2] | 4.0 |

[1]Hydrous magnesium aluminum silicate.
[2]Contains 2.0 parts of lignin sulfonate and 2.0 parts ethylene oxide-nonyl phenol adduct (9 moles ethylene oxide per mole of phenol).

This wettable powder can be dispersed in water in the ratio of one pound of powder per 100 gallons of water and the resulting dispersion sprayed over 1 acre of plants.

Mildew and bacteria resistant paints containing the biologically active polymers can be employed wherever the growth of organisms is undesirable. For example, they can be used in hospitals, dairies, breweries and the like to control the growth of infectious organisms, or on exterior wooden surfaces to prevent dry rot or mildew growth. Mildew and bacteria resistant paints are either water-based paints (including those containing butadiene-styrene polymers, butadiene-acrylonitrile polymers and vinyl acetate polymers), or oil-based paints (including those containing alkyd polymers, natural varnishes and phenol-formaldehyde polymers. Such paints typically also contain pigments, thickeners, fillers, driers, solvents and thinners. Mildew and bacteria resistant paints formulated in accordance with this invention typically contain about 0.05–30% of biologically active polymer based on the weight of the total paint. Preferred mildew and bacteria resistant paints contain about 0.1–1.0% biologically active polymer.

A typical mildew and bacteria resistant paint formulated in accordance with this invention has the following composition wherein all parts are parts by weight.

| | |
|---|---|
| Titanium dioxide | 26.2 |
| Calcium silicate | 4.4 |
| Calcium carbonate | 19.5 |
| Magnesium silicate | 8.2 |
| Isophthalic acid-menhaden oil alkyd | 11.6 |
| Blown menhaden oil | 3.9 |
| Cobalt naphthenate drier | 1.1 |
| Manganese naphthenate drier | 0.4 |
| Tri-n-butyltin methacrylate copolymer | 0.1 |
| Mineral spirits | 24.7 |

Another preferred biologically active composition based upon the novel biologically active polymers of this invention is an aerosol spray composition. Aerosol spray compositions formulated in accordance with this invention typically contain a solvent or diluent, a propellant, and as an active ingredient, the biologically active polymers of this invention.

A typical spray formulation contains about 10–30% by weight solvent, 69–89% by weight propellant and about 0.01–1.0% by weight biologically active polymer. A typical aerosol spray composition of this invention is as follows wherein all parts are parts by weight.

| | |
|---|---|
| Tri-n-butyltin methacrylate copolymer | 0.1 |
| Toluene | 0.15 |
| Isopropanol | 15.0 |
| Propellant (dichlorodifluoromethane) | 84.75 |

Materials treated with any of the above compositions are rendered resistant to attack by bacteria, fungi, mildew, mold and marine organisms, for unexpectedly long periods of use.

The following examples illustrate the present method and the improved polymers obtained thereby.

EXAMPLE 1

This example demonstrates the preparation of a preferred biologically active copolymer. A 3 liter capacity polymerization reactor equipped with a nitrogen inlet, water cooled condenser, thermometer, and mechanically driven stirrer is charged with 375 g. of tributyltin methacrylate, 100 g. of methyl methacrylate, 1 liter of heptane and 0.095 g. of benzoyl peroxide (equivalent to 0.02%, based on total monomer weight). The contents of the reactor were heated at 80° C. for 16 hours to obtain a 95% conversion to polymer.

A number of other copolymers were prepared using the foregoing procedure with the exception that the heptane was replaced by an equal volume of xylene or a mixture containing 0.5 liter of heptane and 0.5 liter of xylene. The latter is within the scope of the present method.

The biological activity of the triorganotin-containing polymers results from hydrolysis of the triorganotin moieties to form the corresponding oxide or hydroxide, which is believed to be the active species. The rate at which this hydrolysis occurs will therefore determine the concentration of active species at any given time as well as the duration of biological activity, since once the active species is formed it can readily be removed from the substrate. This is particularly true if the substrate is immersed in a liquid medium such as water. This can occur when the polymers are incorporated into antifouling coatings. It would therefore be desirable to be able to control the rate of hydrolysis by controlling the structure of the polymer. The present method achieves this goal by selection of a suitable liquid polymerization medium. It is evident from the data in the accompanying table that the rate of hydrolysis is directly proportional to the relative concentration of aromatic hydrocarbons in the polymerization medium.

The extent of hydrolysis of the polymers was determined by adding a solution containing 98.2 g. of the polymer to 1.782 liters of glacial acetic acid and heating the mixture to the boiling point. To the resultant solution was gradually added 478.7 g. of an aqueous solution containing 65% by weight of concentrated (98%) sulfuric acid. Heating and stirring were continued for 1 hour, at which time a sample was removed from the reactor. The polymer present in the sample was precipitated by the addition of water and then washed three times with water. The polymer was then dissolved in tetrahydrofuran, precipitated by the addition of water and then dried prior to being analyzed for tin content.

The extent of hydrolysis, molecular weight (MW) and second order glass transition temperatures ($T_g$) of polymers prepaed using various ratios of tri-n-butyltin methacrylate (TBTM) and methyl methacrylate (MMA) in heptane, xylene or a mixture containing equal weights of heptane and xylene (1 liter of solvent per 475 g. of monomer) are summarized in the following table.

Table 1

| Molar Ratio TBTM/MMA | Solvent | Extent of Hydrolysis (% Sn lost during 1 Hour) | MW x $10^{-3}$ | $T_g$ ° C. |
|---|---|---|---|---|
| 60/40 | Heptane | 70 | — | −51 |
| 50/50 | Heptane | 45 | 57 | −38 |
| 60/40 | Xylene | 81 | — | +7 |
| 50/50 | Xylene | 87 | 60 | −1 |
| 60/40 | Heptane/Xylene | 73 | 55 | −45 |

Table 1-continued

| Molar Ratio TBTM/MMA | Solvent | Extent of Hydrolysis (% Sn lost during 1 Hour) | MW x 10−3 | $T_g$ ° C. |
|---|---|---|---|---|
| 50/50 | Heptane/Xylene | 78 | — | +9 |

The foregoing data demonstrate that the extent of hydrolysis is dependent on the solvent used to prepare the polymers. The molecular weights of the polymers are relatively constant irrespective of solvent. The glass transition temperature of the polymers varies not only with comonomer composition, but also with the solvent used in the process. Hence, differences in the extent of hydrolysis result from a variation in the sequence of repeating units in the polymer molecule.

EXAMPLE 2

This example demonstrates the influence of monomer concentration in the polymerization mixture on the extent of conversion into polymer. The polymerizations were conducted in heptane using benzoyl peroxide as the free radical initiator at a concentration of 0.0075 mole %, based on total monomer. The monomers employed were tributyltin methacrylate and methyl methacrylate in a 1:1 molar ratio. This ratio maximizes the degree of alternation of repeating units.

Table 2

| Comonomer Concentration | Extent of Polymerization at 80° C., after 16 hours |
|---|---|
| 1 mole/liter | 67% |
| 1.5 moles/liter | 75% |
| 2 moles/liter | 95% |

EXAMPLE 3

This example illustrates the use of a preferred biologically active polymer as an antifouling agent. Fiberglass discs with a 2.5 inch radius were coated with films prepared using a 40% by weight solution of all polymers listed in Table 1 using the solvents specified therein. The test discs together with a number of untreated discs were immersed below tide level in the ocean at Key Biscayne, Fla. The discs were immersed so as to test both plant and animal fouling resistance. After 4 weeks of immersion, all test discs were completely free of fouling organisms, whereas the untreated discs were completely fouled.

EXAMPLE 4

This example illustrates the biological activity of the preferred polymer against bacteria and fungi. In these tests a nutrient agar medium is melted and inoculated with the desired organism. The seeded agar is then placed in a petri dish and a 6mm well cut from the center of the agar. The polymer to be tested is placed in the well. The dish is then refrigerated at 5° C. for 24 hours, after which it is incubated either at 37° C. for 24 hours for testing against bacteria or at 30° C. for 5 days for testing against fungi.

The dish is then examined and the activity of test polymer is rated by measuring the distance from the edge of the well which remains free of test organism growth. The width, in millimeters, of the zone of complete inhibition is an indication of the activity of the test material.

Table 3 summarizes the test materials, test organisms, and activity results. The test results are the zone of inhibition, in millimeters. The test materials correspond to the same polymers listed in Table 1 of Example 1.

Table 3

| Polymer (TBMA/MMA) | | Bacteria | | Fungi | |
|---|---|---|---|---|---|
| | | Staphylococcus aureus | Pseudomon aeruginosa | Aspergillus niger | Penicillium fumiculosum |
| 50/50 | (Heptane) | 7 | 4 | 6 | 5 |
| 50/50 | (Heptane/Xylene) | 7 | 4 | 6 | 6 |
| None | (Control) | 0 | 0 | 0 | 0 |

The results show that the biologically active polymers are useful fungicides and bactericides.

What is claimed is:

1. In an improved method for preparing biologically active polymers exhibiting reduced rates of hydrolysis and reduced second order glass transition temperatures by reacting at least one solubilized triorganotin compound of the general formula

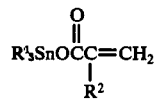

with at least one solubilized monomer of the general formula

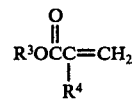

at a temperature from 50° to 100° C. and in the presence of an organic solvent for the monomers and an effective amount of a free radical polymerization initiator, wherein $R^1$ represents an alkyl radial containing from 1 to 8 carbon atoms, a cyclohexyl or a phenyl radical, $R^2$ and $R^4$ are individually selected from hydrogen and methyl radicals and $R^3$ represents an alkyl radical containing from 1 to 18 carbon atoms, a cyclohexyl or a phenyl radical, the improvement which consists of reacting said monomers in an organic solvent containing from 50 to 100% by volume of at least one liquid aliphatic or cycloaliphatic hydrocarbon containing from 5 to 16 carbon atoms, any remaining portion of said organic solvent consisting essentially of at least one liquid aromatic hydrocarbon.

2. An improved method as set forth in claim 1 wherein said triorganotin compound constitutes from 10 to 90 mole % of the total monomers.

3. An improved method as set forth in claim 2 wherein said triorganotin compound constitutes from 30 to 70 mole % of the total monomers.

4. An improved method as set forth in claim 1 wherein the concentration of monomers is from 1.5 to 5 moles per liter of reaction mixture.

5. An improved method as set forth in claim 4 wherein said concentration is greater than 2 moles per liter.

6. An improved method as set forth in claim 1 wherein said organic solvent consists essentially of at least one aliphatic hydrocarbon containing from 7 to 14 carbon atoms.

7. An improved method as set forth in claim 1 wherein said organic solvent contains from 50 to 100% by volume of heptane, or a mixture of aliphatic hydrocarbons containing heptane, any remaining portion of said solvent being xylene.

8. An improved method as set forth in claim 1 wherein the reaction is conducted at a temperature from 70° to 85° C.

9. An improved method as set forth in claim 1 wherein the concentration of free radical initiator is from 0.001 to 0.01 mole %, based on total monomers.

* * * * *